March 1, 1960 E. KNECHT 2,926,921

TONE ARM MECHANISM

Filed Aug. 20, 1954 2 Sheets-Sheet 1

Inventor:
EMIL KNECHT

By [signature]
ATTORNEY

TONE ARM MECHANISM

Filed Aug. 20, 1954 2 Sheets-Sheet 2

Inventor:
EMIL KNECHT
By [signature]
ATTORNEY

United States Patent Office 2,926,921

Patented Mar. 1, 1960

2,926,921

TONE ARM MECHANISM

Emil Knecht, St. Georgen, Schwarzwald, Germany

Application August 20, 1954, Serial No. 451,086

11 Claims. (Cl. 274—31)

This invention relates to a record player having a pick-up or transducer with two needles of different shapes for the reproduction of different types of recordings.

It is known to provide record players with a pick-up provided with two reproducing needles in order thus to be able to use the gramophone needle adapted to the record which is to be played at any particular time. A distinction has hitherto been made mainly between three types of record, namely standard records which rotate at 78 revolutions per minute, and long-playing records at 33⅓ revolutions per minute, and, finally, micro-groove records, which are played at 45 revolutions per minute. These records differ, however, not only in respect of the speed of revolution, but also in respect of the shape of the grooves. Needles of different cut are, accordingly, required for long-playing records and micro-groove records from that required for standard records.

The use of different types of gramophone needles entails the risk of confusion thereof, and this may lead to considerable damage, particularly when gramophone needles intended for standard records are used for long-playing or micro-groove records.

In order to prevent this confusion of the gramophone needles, it has been proposed to combine the change-over of the pick-up or of the gramophone needle with the change-over of the speed of revolution of the turntable, so that a specific gramophone needle is allotted to each speed of revolution of the turntable. This proposal is based on records of the same size always being made with the same groove shape.

This assumption that a specific groove form is allotted to each record size or each speed of revolution, and that each record size accordingly necessitates the use of a specific shape of needle, has lost its earlier validity in consequence of the fact that records of the same size are made with different groove shapes. In addition to the standard records of 78 revolutions per minute, there are, for example, already records of the same speed of revolution but made with micro-grooves. With such records the speed of revolution can no longer be taken as the decisive criterion for the choice of the gramophone needle. The same conditions would result when records for 33⅓ or 45 revolutions per minute are recorded in another groove shape.

In order to obviate the difficulties arising from such conditions the present invention contemplates a return to the principle of individual selection of the gramophone needle and proposes to prevent the use of an unsuitable gramophone needle by providing for each needle a hand-operated selector for adjusting the pick-up for operation with the proper stylus and, in addition, by making operation, of the record player drive dependent on the operation of the selector.

An arrangement of this type may be effected in various ways. It has proved advantageous to provide in addition to the selectors a hand-operating starting means for the record player drive, which starting means is stopped by a lock, which can be released by each of the selectors.

An arrangement of this type ensures that the record player cannot be set in operation without a gramophone needle being pre-selected. If the user of the equipment tries to start it unsuccessfully, this will inspire him to greater attention and compel him to select the playing needle individually. This choice will be effected, not thoughtlessly, but consciously, and will, accordingly, be correct.

One embodiment of the invention has proved itself wherein the selectors are simultaneously constructed as alternately utilisable starting means for the record player drive.

It is advisable to construct all the hand-operated members, i.e., the selectors for positioning the needle adjustment of the pick-up with the appropriate needle in playing position for the selected record to be played and the starting means for starting the record player, as push-button keys, which permit clear marking and labelling.

In order to enable correct positioning of the appropriate needle of the pick-up dependably, it is advantageous to secure the pick-up in the position of rest, in which the change-over is to be effected. This securing may be effected in various ways; for example a hand-operated locking device may be provided. It is, however, also possible to construct this locking device as an automatic lock, which is so coupled to the starting device that it is released when the starting device is operated.

A locking device of this type serves at the same time as a safety device for the purposes of transportation, the advantage of which consists in that the sound head is also secured with the tone arm and the sensitive playing needles are protected against damage.

In order to enable the invention to be more readily understood, reference is made to the accompanying drawing which illustrate diagrammatically and by way of example two embodiment thereof, and in which.

Figure 1:
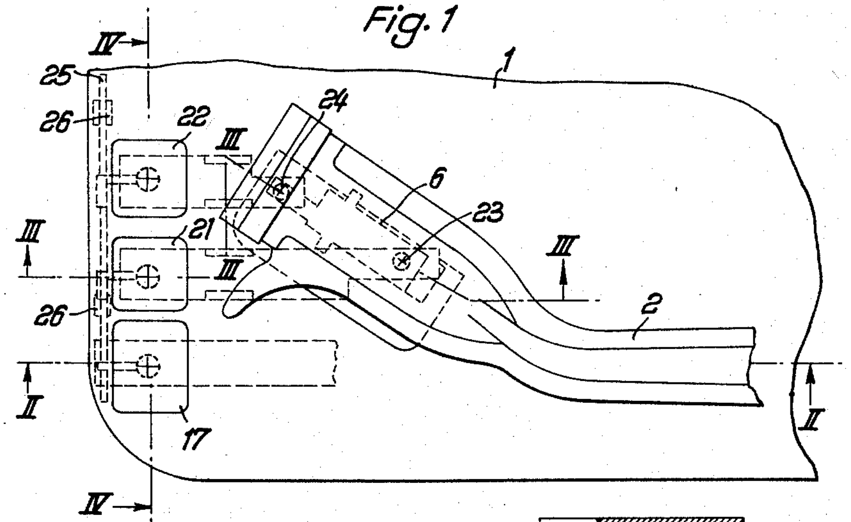
Figure 1 is a partial plan view of a record player.

Of the record player there is illustrated in the drawing only a part of the mounting plate 1 and part of the tone arm 2, which rests, in the position of rest, on a stay 3 and a support 4. The support 4 is provided with a depression, in which the downwardly projecting part, which carries the playing needles 5*n* and 5*m*, of the pick-up 6 projects. The pick-up 6 is rockably mounted in the front end of the tone arm 2, so that the two playing needles are brought alternately into the playing position. The two needles are of different cut. The needle 5*n* serves for playing standard records, the needle 5*m* for playing long-playing and micro-groove records. In the position of rest, the tone arm 2 is locked with the aid of the lever 7, which engages by its hook-shaped end in the opening 8 of the tone arm web 9. The locking lever 7, which is rockably mounted at 10, is subject to the influence of a tension spring 11 and has at its lower end a bevel 12, with which the pin 13 of the starting lever 15, which is rockably mounted at 14, cooperates. The starting lever serves to actuate a contact arrangement 16 lying in the current circuit or in the connecting current circuit of the driving motor.

Figures 2, 3, 4:
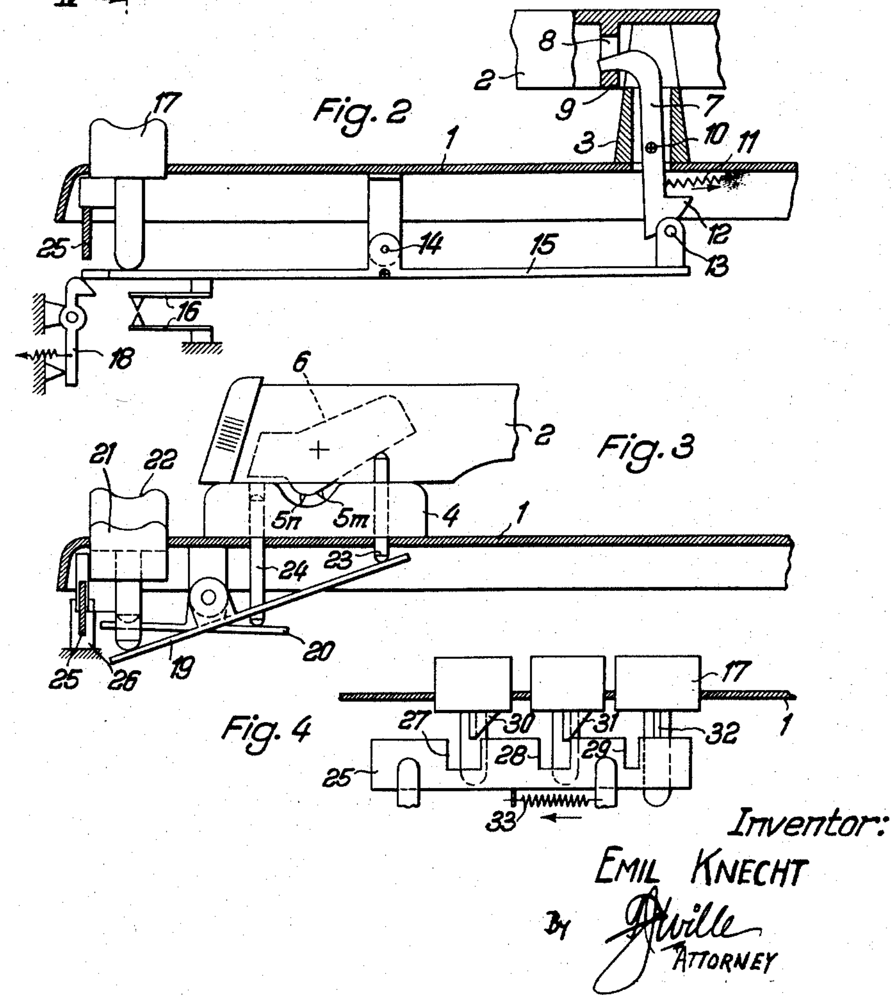
Figure 2 is a part-sectional view on the line II—II in Figure 1.
Figure 3 is a part-sectional view on the line III—III in Figure 1.
Figure 4 is a part-sectional view on the line IV—IV in Figure 1.

In Figures 1, 2 and 4 a push-button key 17, which is advantageously equipped with a return spring, is provided for actuating the starting lever 15. On operation thereof, the starting lever 15 is secured in the adjusted position, this being effected for example with the aid of a stop pawl 18. In consequence, the contact 16 remains closed and the lever 7 unlocked until the pawl 18 is released by the motor mechanism or the control mechanism for the movement of the tone arm.

The needle selection of the pick-up 6 is effected with the aid of rockably mounted double-levers 19, 20, which can be actuated by means of the push-button keys 21 and 22 respectively, and which, in turn, effect a displacement of push rods 23 and 24, which cause the rocking of the pick-up 6. The push-button key 21 brings the needle 5*n* into the playing position. The push-button key 22 is allotted to the needle 5*m*.

The push-button keys 17, 21 and 22 are mounted in one row in Figure 1. A bar 25 is allotted to the three push-button keys and rests in two bearings 26 and forms a lock, which renders operation of the starting key 17 dependent on the prior operation of one of the keys 21, 22, that is to say dependent on the pre-selection of one of the two needles 5*n* and 5*m*. For this purpose, the bar 25 in Figure 4 is provided with three cut-out portions 27, 28 and 29, which co-operate with downwardly projecting lugs 30, 31 and 32 of the push-button keys. When one of the keys 21 and 22 is operated, the bar 25 is displaced against the action of its compression spring 33 by one of the lugs 30 or 31 to such extent that the lug 32 of the starting key 17 lies above the cut-out portion 29 and the starting push-button key 17 can, in consequence, be depressed. Starting without prior operation of one of the two keys 21 and 22 is not possible. The push-button keys return in each case when released to the position seen in Figure 4, so that the locking bar 25 is also conveyed back by the spring 33 into its starting position, in which the starting key 17 is locked.

Figure 5:
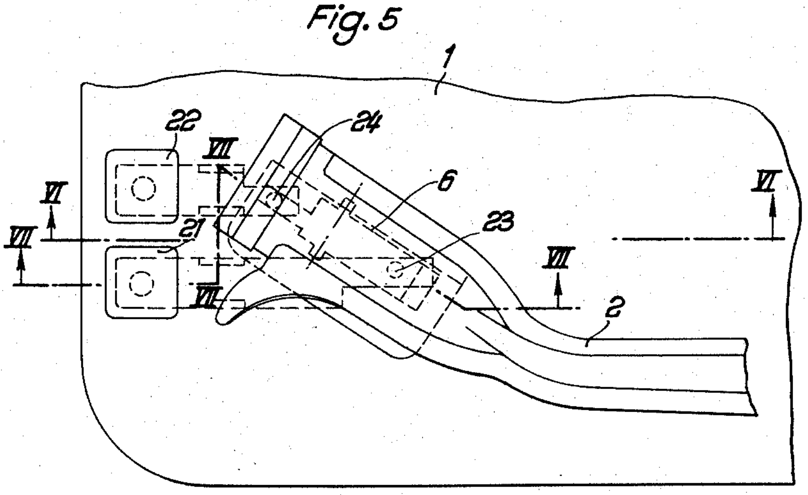
Figure 5 is a plan view, corresponding to Figure 1, of a second embodiment of record player.
Figures 6, 7:
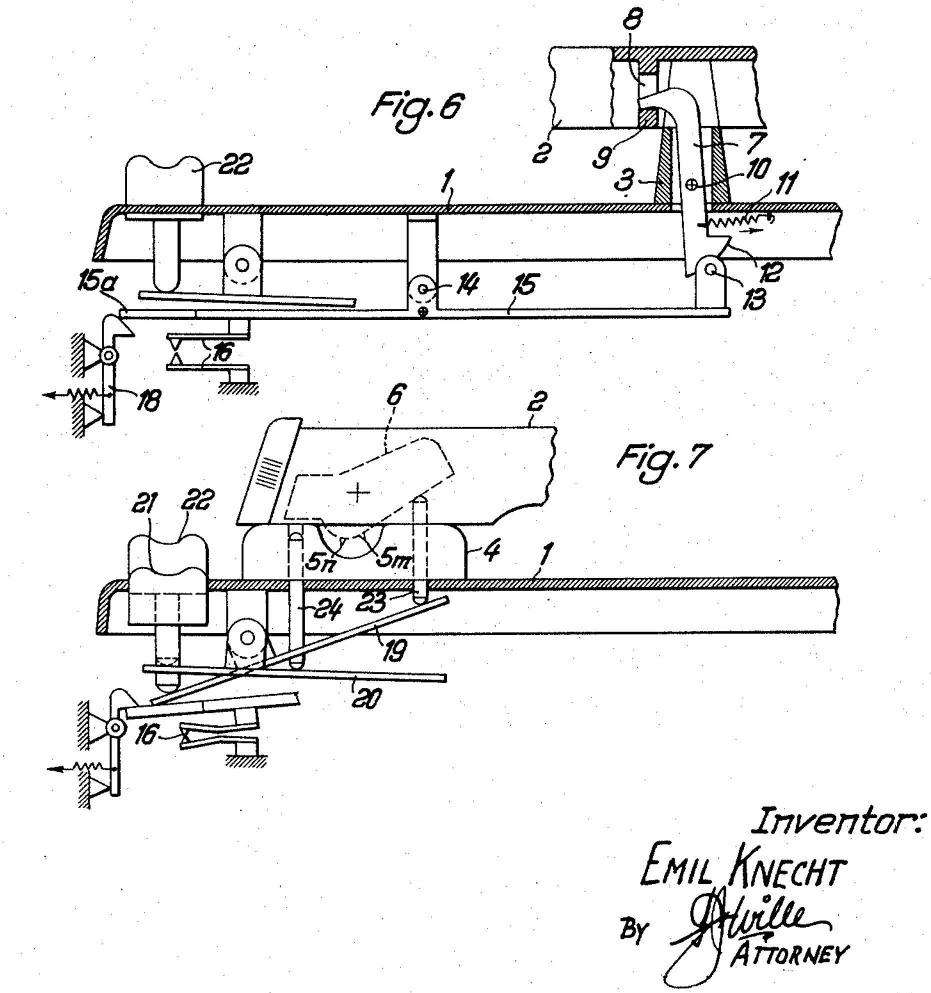
Figure 6 is a part-sectional view on the line VI—VI in Figure 5.
Figure 7 is a part-sectional view on the line VII—VII in Figure 5.

In the embodiment shown in Figures 5 to 7, the starting lever 15 is operated by the push-button keys 21 and 22. In order to render this possible, the end 15*a* of the starting lever 15 is made of such width that it engages under two double-levers 19, 20. In this way the lever 15 is rocked, when one of the keys 21 and 22 is pressed, in order to switch in the contact arrangement 16 and to effect the unlocking of the tone arm 2.

When the tone arm 2 is returned to its position of rest, after completion of playing, the starting lever 15, secured by means of the pawl 18, is released in the two embodiments illustrated, so that it can return to the position seen in Figure 2 or Figure 6. This renders it impossible for the lever 7 to release the tone arm 2.

I claim:

1. A record player for records with grooves of standard shape and of the long-playing type shape comprising a transducer, a tone arm supporting the transducer, a needle carrying rotatable element supported in the transducer, a pair of needles radially spaced extending from the rotatable element, one needle of the pair being of the shape for standard record grooves and the other of the shape for long-playing record grooves, a turntable, a pair of manually operable selector means each adapted on operation to rotate the rotatable element to position the predetermined needle of the pair in playing relation to the turntable, self-restoring means locking the tone arm against subsequent restarting after one start has been made, and releasing means manually operable to release the locking means only after one of the selector means has been operated.

2. A record player according to claim 1 in which the tone arm locking means includes a pair of contacts in the electrical driving means circuit for the turntable, the contact pair being open in the tone arm locking position and closed for the interval the tone arm locking means is released.

3. A record player for records with grooves of standard shape and of the long-playing type shape comprising a transducer, a tone arm supporting the transducer, a mounting plate on which the tone arm is rotatably supported, a needle carrying element rotatably supported in the transducer, a pair of needles radially spaced extending from the rotatable element, one needle of the pair being of the shape for standard record grooves and the other of the shape for long-playing record grooves, the rotatable needle carrying element having a pair of diametrically opposite projections, a pair of manually operable selector means each adapted on operation to rotate the rotatable element to position the predetermined needle of the pair in playing relation to the turntable, each of the selector means comprising a first lever pivoted at an intermediate region to the mounting plate, a push button extending through the mounting plate and engaging one end region of the first lever, and a pin extending slidably through the mounting plate with its lower end abutting the other end region of the first lever, the pin being aligned with one projection of the rotatable needle carrying element with its upper end spaced from the projection when the push button is unactuated and adapted on manual depression of the push button with its upper end to engage that one of the pair of diametrically opposite projections to rotate the rotatable element to position the needle of the pair cooperating with the particular selector means in record playing position relative to the turn table, self-restoring means locking the tone arm against movement whenever the tone arm comes to rest, and releasing means manually operable to release the locking means only after one of the pair of selector means has been operated.

4. A record player according to claim 3 in which the means locking the tone arm against movement in its starting position comprises a second lever pivoted at an intermediate region to the mounting plate, a second push button extending through the mounting plate and adapted on depression to depress one end region of the second lever, a spring biased first pawl adapted on depression of such one end region to engage therewith and to hold the second lever with the one end region depressed, a pin extending from the other end region of the second lever, a pivoted third lever extending through the mounting plate and into the tone arm, a beveled projection at the lower end region of the third lever, a second pawl at the upper end of the third lever, a spring biasing the third lever to engage the beveled projection to the pin, the pin on depression of the one end of the second lever and the corresponding elevation of the other end thereof pivoting the third lever against the tension of the spring, and an aperture in the tone arm, the second pawl engaging into the aperture of the tone arm when the tone arm is in its record playing starting position and the second lever is unoperated, and disengaging from the aperture to release the tone arm on depression of the one end region of the second lever.

5. A record player according to claim 1 in which the rotatable needle carrying element has a pair of diametrically opposite projections, a mounting plate rotatably supporting the tone arm, each selector means comprises a first lever pivoted at an intermediate region to the mounting plate, a first push button extending through the mounting plate and engaging one end region of the first lever, a tapering projection on the first push button below the mounting plate, and a first pin slidably extending through the mounting plate and carried by the other end region of the first lever with the upper end of the pin spaced from a projection of the needle carrying element and adapted on depression of the first push button to engage that one of the pair of diametrically opposite projections to rotate the rotatable element to position the needle of the pair assigned to the particular selector means in record playing position relative to the turntable, in which the means locking the tone arm against movement in its starting position comprises a second lever pivoted at an intermediate region to the mounting plate, a second push button extending through the mounting plate adapted on depression to depress one end region of the second lever, a spring biased first pawl engages the one end region of the second lever on depression to maintain such end region depressed, a second pin extending from the other end region of the second lever, a pivoted third lever extending through the mounting plate, a beveled projection at the lower end region of the third lever, a second pawl at the upper end of the third lever, a spring biasing the third lever to engage the beveled projection with the second pin, the second pin tending to pivot the third lever against the tension of the spring, an aperture defining means in the tone arm, the second pawl engaging into the aperture means when the tone arm is in its starting position and the second lever is unoperated and disengaging from the aperture means on depression of the one end region of the second lever, and a third pin extending from the second push button, and in which a slide member is positioned below the mounting plate of a height to engage the bottom portion of each tapering projection on the first push button and the bottom portion of the third pin on the second push button, an individual recess in the slide member for each of the first push button tapering projections and the third pin, and a second spring biasing the slide member so that with the first and second push buttons unoperated the bottom and narrower region of the tapering projections registers with its recess while the third pin abuts the top of the slide member while on depression of one first push button tapering projection with its wider and upper region into its recess the third pin is registered with its recess by movement of the slide member against its spring to permit depression of the second push button.

6. A record player according to claim 1 in which the rotatable needle carrying element has a pair of diametrically opposite projections, a mounting plate rotatably supporting the tone arm, each selector means comprises a first lever pivoted at an intermediate region to and below the mounting plate, a first push button extending through the mounting plate and engaging one end region of the first lever, and a first pin slidably extending through the mounting plate with its lower end carried by the other end region of the first lever so that the upper end of the first pin is spaced from a projection of the pair of the needle carrying element and adapted on manual depression of the first push button to engage that one of the pair of diametrically opposite projections to rotate the rotatable element to position the needle of the pair assigned to the particular selector means in record playing position relative to the turntable, and in which the means locking the tone arm against movement in its starting position comprises a second lever pivoted at an intermediate region to and below the mounting plate, the one end region of the second lever lying below the one end regions of each of the first levers and adapted to be depressed thereby on depression of either of the first levers, a spring biased first pawl engaging the one end region of the second lever on depression to maintain such region depressed, a second pin extending from the other end region of the second lever, a pivoted third lever extending through the mounting plate and into the tone arm, a beveled projection at the lower end of the third lever, a second pawl at the upper end of the third lever, a spring biasing the beveled projection into engagement with the second pin, the second pin tending to rock the third lever against the tension of the spring, an aperture defining means in the tone arm, the second pawl engaging into the aperture means when the tone arm is in the starting position and the second lever is unoperated and disengaging therefrom on depression of the one end region of the second lever on depression of either of the first levers by its first push button.

7. In a phonograph record player for records with grooves of a plurality of shapes and having a driving means, a mounting plate, and a tone arm rotatably supported on the plate, the combination of a rockable pick-up mounted on the tone arm, a plurality of needles supported in spaced relation on the pick-up of which each needle corresponds to the shape of a particular groove respectively, means including a corresponding plurality of manually operable selectors to rock the pick-up into different positions to select one needle of the plurality and position it into record playing position, starting mechanism for the driving means, and self-restoring means interlocking the selectors and the starting mechanism to prevent subsequent reactuation of the starting mechanism after the driving mechanism has been actuated once and then stopped until after at least one of the selectors has been actuated.

8. In a phonograph for records with grooves of different shapes having a driving means and a tone arm, the combination of a rockable pick-up mounted on the tone arm, a plurality of needles each for engagement with a particular form of record groove supported by the pick-up, a plurality of manually operable selectors to rock the pick-up, a manually operable starting means for the driving means, a lock bar for the starting means, and a biasing spring against the tension of which the lock bar is displaced on actuation of at least one of the selectors to release the starting means for actuation and which restores the lock bar stopping of the driving means.

9. In a phonograph having drive means and a swingable tone arm the combination of a rockable pick-up mounted on the tone arm, a plurality of needles supported by the pick-up, means including a plurality of manually operable selectors to rock the pick-up into different positions and thereby to select one of the needles of the plurality and move it into playing position, starting mechanism for the drive means, an interlocking mechanism normally positioning both the plurality of selectors and the starting mechanism in pre-operated position and preventing actuation of the starting mechanism until after actuation of at least one of the selectors, and locking means for securing the tone arm in its rest position.

10. In a phonograph having drive means and a swingable tone arm the combination of a rockable pick-up mounted on the tone arm, a plurality of needles supported by the pick-up, means including a plurality of manual selectors to rock the pick-up into different positions and thereby to select one of the needles of the plurality and move it into playing position, starting mechanism for the drive means, an interlocking mechanism biased to maintain both the starting mechanism and the selectors unactuated and to prevent actuation of the starting mechanism with the selectors of the plurality unactuated, locking means for securing the tone arm in its rest position, and means controlled by the starting mechanism to release the locking means.

11. In a phonograph having drive means and a swingable tone arm the combination of a rockable pick-up mounted on the tone arm, a plurality of needles supported by the pick-up, a plurality of selectors including push button keys to operate individual selectors to rock the pick-up, starting mechanism for the drive means including a push button key to operate it, and interlocking mechanism normally biasing and restoring all keys to the preoperated position and actuatable by the selector keys to release the start push button key for actuation.

References Cited in the file of this patent

UNITED STATES PATENTS

| | | |
|---|---|---|
| 2,113,401 | Goldsmith | Apr. 5, 1938 |
| 2,506,665 | Giovannucci | May 9, 1950 |
| 2,526,188 | Andres | Oct. 17, 1950 |
| 2,689,734 | Wennerbo | Sept. 21, 1954 |
| 2,718,399 | Martin | Sept. 20, 1955 |